United States Patent
De Sousa Pereira

(10) Patent No.: US 11,881,755 B2
(45) Date of Patent: Jan. 23, 2024

(54) POWER TRANSMISSION SYSTEM USING MAGNETS

(71) Applicant: NEODYMOTORS GMBH, Munich (DE)

(72) Inventor: Paulo Eduardo De Sousa Pereira, Munich (DE)

(73) Assignee: NEODYMOTORS GMBH, Munich (DE)

( * ) Notice: Subject to any disclaimer, the term of this patent is extended or adjusted under 35 U.S.C. 154(b) by 246 days.

(21) Appl. No.: 17/417,579

(22) PCT Filed: Mar. 8, 2019

(86) PCT No.: PCT/IB2019/051906
§ 371 (c)(1),
(2) Date: Jun. 23, 2021

(87) PCT Pub. No.: WO2020/183218
PCT Pub. Date: Sep. 17, 2020

(65) Prior Publication Data
US 2022/0060098 A1 Feb. 24, 2022

(51) Int. Cl.
*H02K 53/00* (2006.01)
*H02K 1/02* (2006.01)
*H01F 1/057* (2006.01)
*H02K 7/10* (2006.01)
*H02K 16/00* (2006.01)

(52) U.S. Cl.
CPC ............ *H02K 53/00* (2013.01); *H01F 1/057* (2013.01); *H02K 1/02* (2013.01); *H02K 7/1004* (2013.01); *H02K 16/005* (2013.01)

(58) Field of Classification Search
CPC ........ H02K 53/00; H02K 1/02; H02K 7/1004; H02K 16/005; H02K 2201/12; H02K 49/102; H01F 1/057
See application file for complete search history.

(56) References Cited

U.S. PATENT DOCUMENTS

| 5,925,958 A | 7/1999 | Pirc |
| 2010/0156223 A1 | 6/2010 | Tkadlec |
| 2010/0187930 A1 | 7/2010 | Marquis |

(Continued)

FOREIGN PATENT DOCUMENTS

| CN | 107489739 A | * 12/2017 | ............... F16H 1/34 |
| ES | 2316274 A1 | 4/2009 | |

(Continued)

OTHER PUBLICATIONS

CN107489739A English translation (Year: 2023).*

(Continued)

*Primary Examiner* — Christopher M Koehler
*Assistant Examiner* — Viswanathan Subramanian
(74) *Attorney, Agent, or Firm* — Lucas & Mercanti, LLP

(57) ABSTRACT

A power generation system which is mounted on at least one triangular shaped horizontal base on which is placed a cylindrical platform at the center, which is called a primary rotor, and a set of three cylindrical platforms, which are called secondary rotors, which surround the first rotor. The primary rotor and secondary rotors have a specific set of neodymium magnets and are fixed on vertical axis bearings mounted on the said horizontal base.

12 Claims, 3 Drawing Sheets

(56) References Cited

U.S. PATENT DOCUMENTS

| | | | |
|---|---|---|---|
| 2016/0288006 A1* | 10/2016 | Shen | A63H 30/04 |
| 2017/0194083 A1* | 7/2017 | Bohannon | F16B 7/0406 |
| 2018/0083507 A1* | 3/2018 | Tokizaki | H02K 3/50 |
| 2018/0351446 A1* | 12/2018 | Wong | H02K 3/46 |

FOREIGN PATENT DOCUMENTS

| | | | |
|---|---|---|---|
| WO | 02/03530 A1 | 1/2002 | |
| WO | WO-2010089465 A1 * | 8/2010 | H02K 49/102 |

OTHER PUBLICATIONS

WO2010089465A1 English translation (Year: 2023).*

International Search Report and Written Opinion dated Oct. 30, 2019 for PCT/IB2019/051906.

* cited by examiner

POWER TRANSMISSION SYSTEM USING MAGNETS

CROSS-REFERENCE TO RELATED APPLICATIONS

This application is a 371 of PCT/IB2019/051906, filed Mar. 8, 2019, which is incorporated herein by reference.

TECHNICAL FIELD

This application describes a power transmission system.

BACKGROUND

With the phenomenon of global warming, society has become more receptive to research and development of new power transmission systems.

One of the most widely studied interactions is the interaction between kinetic energy and magnetic energy, about which there have been many publications which formulate hypotheses for this phenomenon, without, however, presenting any form of practical realization which would allow for a real and concrete interaction between these two types of power.

The power generated by a magnetic relationship between two magnets happens due to the force of attraction and/or repulsion between their two magnetic poles. This relationship can create a repellent or attracting force, pushing the magnets away or bringing them together. To understand this kind of power generated by a magnetic relationship, it is necessary to understand the behavior of the magnets.

Magnets possess indivisible magnetic fields, in the sense that they all present two regions called the north pole and the south pole. According to current theory, the flow of electrons always passes from the north pole to the south pole. And in the case of neodymium magnets, this energy flow has a constant and unaltering working life, independently of its use, of over 30 years, provided that the magnets operate at a temperature of between 0° C. and 50° C.

SUMMARY

This application describes a power transmission system comprising at least one triangular shaped horizontal base, on which is placed a primary rotor at the center, connected to a propulsion system, and a set of three secondary rotors, both fixed on vertical axis bearings secured to the said horizontal base, which surround the primary rotor, and whose spacing between the center of the primary rotor and the centers of the secondary rotors is always the same, wherein magnets are mounted on the said rotors.

In one embodiment, the primary rotor of the power transmission system is placed in a higher position than the secondary rotors.

In yet another embodiment, the propulsion system of the power transmission system is a motor reducer.

In another embodiment, the propulsion system of the energy transmission system is connected to the primary rotor through a set of pulleys with a toothed belt.

In one embodiment, the energy transmission system comprises at least two horizontal bases with an overlapping triangular shape and a propulsion system installed in the center of the lower triangular base.

In another embodiment, the propulsion system of the energy transmission system is directly connected to the axis of the primary rotor through a coupling part.

In yet another embodiment, the north-south division of the magnets used in the secondary rotors of the energy transmission system is in the axial direction parallel to the height of each magnet, while in the primary rotor this division is in a direction parallel to the width of each magnet.

In one embodiment, the horizontal base of the energy transmission system is made from non-magnetic material with a low expansion coefficient.

In another embodiment, the magnets used in the power transmission system are made of a neodymium-iron-boron alloy.

Still in one embodiment, the magnets used in the energy transmission system are coated with an Ni—Cu—Ni alloy.

In one embodiment, the capturing of power produced by the power transmission system is realized through bobbins positioned appropriately around the primary rotor and the secondary rotors.

In another embodiment, the capturing of the energy of the power transmission system is realized through generators installed in the axis of the secondary rotors.

In one embodiment, the power transmission system is installed in a sealed area in a vacuum.

The embodiments previously presented may be combined with each other.

BRIEF DESCRIPTION

This application describes a power transmission system. With this system, it is possible, for the first time, to create kinetic energy through the interaction of magnetic energy, with a system which allows full, constant and uninterrupted rotation of all the rotors which compose the system and which is fully replicable. The system hereby presented is able to produce energy through the magnetic interaction of the magnets existing in its rotors.

The system which is hereby presented at no time violates the law of thermodynamics or conservation of energy. The energy produced does not come from the energy consumed by the Power Transmission System to keep itself working. This is why the output energy of the system bears no relation to the input energy of the system. In fact, the energy produced through the Power Transmission System originates in the magnetic interaction of the magnets, preferably of neodymium, present in its rotors.

The Power Transmission System is mounted on at least one triangular shaped horizontal base on which is placed a cylindrical platform at the center, which is called the primary rotor, and a set of three cylindrical platforms, which are called secondary rotors, which surround the primary rotor. The primary rotor and its secondary rotors comprise a specific set of magnets, which may be of neodymium, and are both fixed on vertical axis bearings mounted on the said horizontal base.

The primary rotor may be placed in a higher position than the secondary rotors. This position may be such that the tops of the magnets installed in the secondary rotors are on the same imaginary line as the base of the magnets installed in the primary rotor.

The propulsion of the Power Transmission System is achieved through a motor reducer, which may be connected to the primary rotor through a set of pulleys with a toothed belt or directly to the axis of the primary rotor through a coupling part.

On activating the propulsion system, the primary rotor initiates and maintains a rotational motion at a constant speed and, immediately, the set of secondary rotors, through the magnetic interaction in its rotors, initiates and maintains a rotational motion at a constant speed. This magnetic interaction does not constitute any kind of magnetic coupling.

Through the magnetic interaction existing in its rotors, the Power Transmission System generates kinetic energy capable of producing and keeping its secondary set of rotors in rotational motion at a constant speed without there being any physical connecting link between the primary rotor and its set of secondary rotors or any type of external energy physically connected to the set of secondary rotors.

To maintain the correct magnetic interaction between the magnets present in the primary rotor and the magnets present in the set of secondary rotors, a constant speed is imposed on the first rotor through the motor reducer which is directly connected to its axis through a coupling part or through a set of pulleys with a toothed belt. This speed is proportional to the intensity of the magnetic field of the magnets which are present in the set of secondary rotors. Another important relationship is the proportion between the mass and the magnetic intensity of each secondary rotor—just as there must be a correct proportional distance between each rotor, and in the height relationship between the primary rotor and the set of secondary rotors, through the intensity of the magnetic field of each rotor. If all these proportions and measurements are not respected, the capacity for the production of energy is greatly affected and may even prevent its functioning.

The force which the kinetic energy produces, capable of creating and maintaining the rotational motion at a constant speed in its set of secondary rotors, derives from the magnetic energy present in the magnetic elements of the Power Transmission System. As a result, we can state that there is no waste.

With this Power Transmission System, it is possible to achieve the following results:
- A high degree of efficiency. The system is capable of producing an approximate gain of 1600% on top of the energy which it consumes in order to keep itself working, bearing in mind a capture of only 10% of the energy produced;
- High production capacity;
- Capacity to produce energy 24 hours per day, in a constant and uninterrupted form, in closed environments and independently of the climatic state of the weather, provided that the ambient temperature is between 0° C. and 50° C.;
- Reduced area of occupation. Due to its physical typology, it occupies a smaller area and possesses great mobility of installation;
- Long working life. The estimated working life of the Power Transmission System is over 30 years, providing that the periodic maintenance terms are respected;
- Zero waste production. During its operation, the system does not have any negative impact on nature or human beings, and does not produce any kind of waste.

BRIEF DESCRIPTION OF THE DRAWINGS

For easier understanding of this application figures have been attached, which represent realizations which, however, are not intended to limit the technique hereby disclosed.

Description of Embodiments

Figure 1:
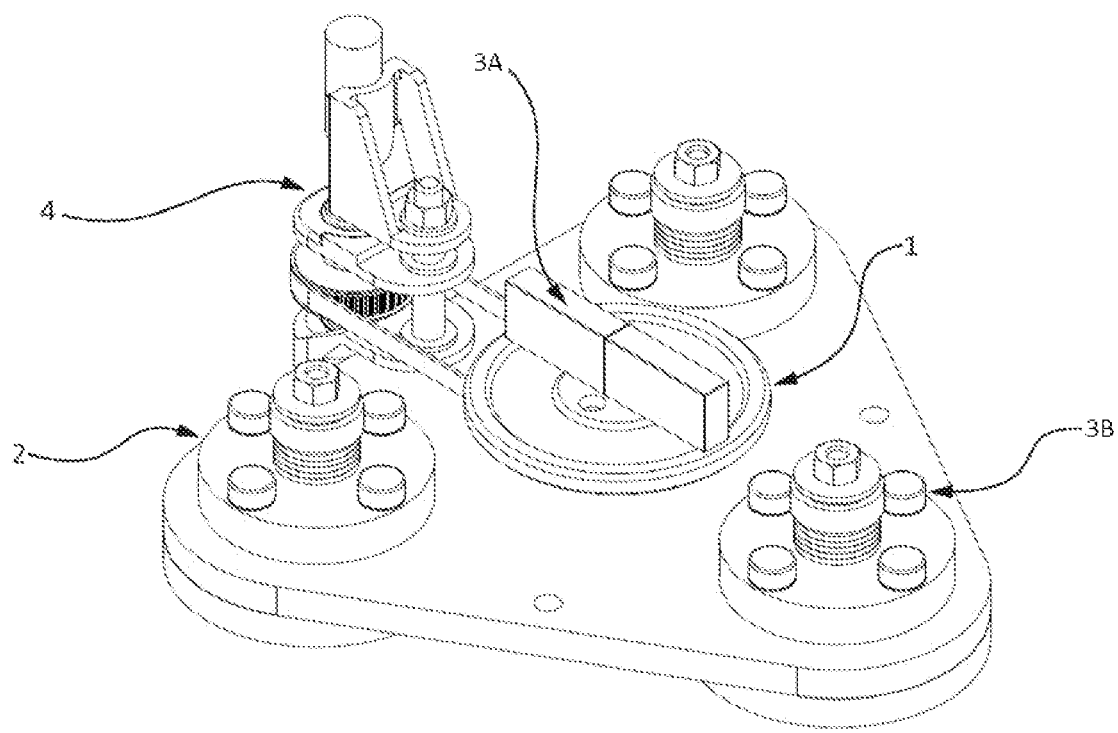
FIG. 1 illustrates a schematic representation of one of the possibilities of the Power Transmission System, where the following elements are represented:
1—Primary rotor;
2—Secondary rotor;
3A—First set of Magnets;
3B—Second set of Magnets;
4—Propulsion system.
Figure 2:
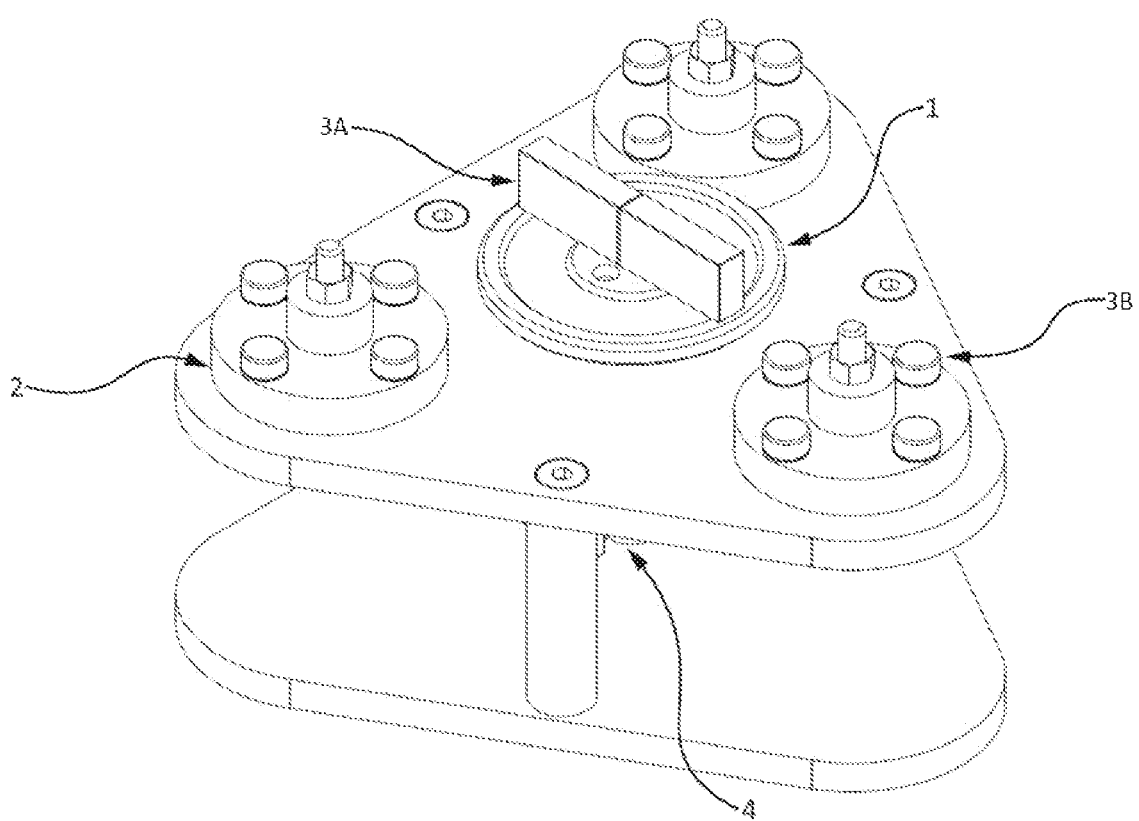
FIG. 2 illustrates a schematic representation of one of the possibilities of the Power Transmission System, where the following elements are represented:
1—Primary rotor;
2—Secondary rotor;
3A—First set of Magnets;
3B—Second set of Magnets;
4—Propulsion system.
Figure 3:
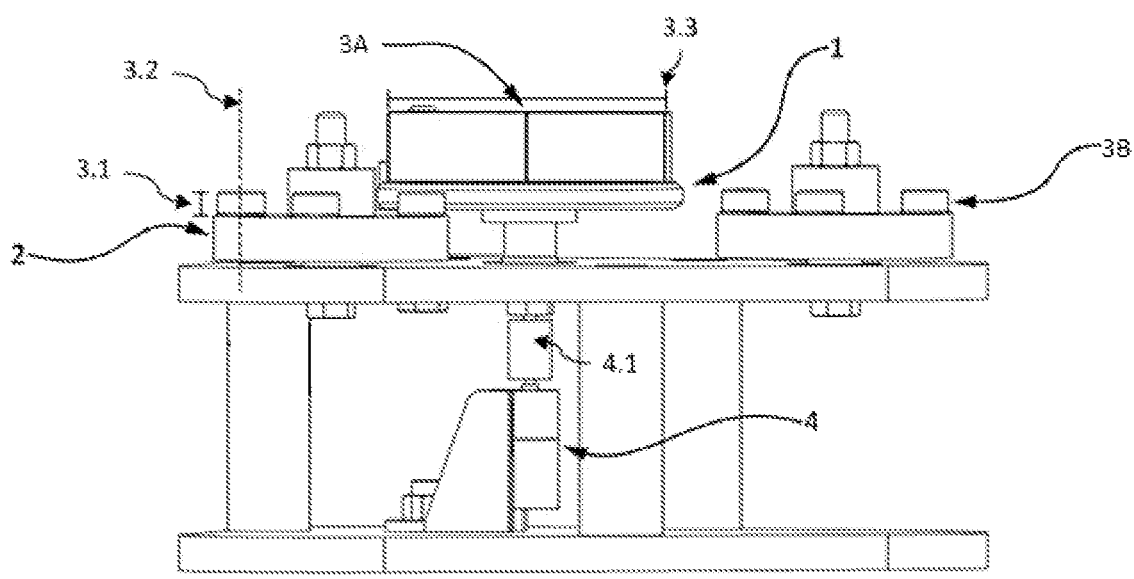
FIG. 3 illustrates a representation of another view of the possibility of the Power Transmission System presented in FIG. 2, where the following elements are represented:
1—Primary rotor;
2—Secondary rotor;
3A—First set of Magnets;
3B—Second set of Magnets;
3.1—magnet height;
3.2—magnet axial direction;
3.3—magnet width;
4—Propulsion system;
4.1—coupling part.

With reference to the figures, some embodiments are described here in more detail, which is not intended, however, to limit the scope of the present application.

The present application describes a Power Transmission System.

The Power Transmission System is mounted on at least one triangular shaped horizontal base on which is placed a cylindrical platform at the center, which is called a primary rotor (1), and a set of three cylindrical platforms, which are called secondary rotors (2), which surround the primary rotor (1). The primary rotor (1) and each of the secondary rotors (2) comprises a set of magnets (3), preferably of neodymium, and they are both fixed on vertical axis bearings mounted on the said horizontal base. The Power Transmission System presents a propulsion system (4) which may be executed by a motor reducer (4), which is connected to the primary rotor (1) through a set of pulleys with a toothed belt or directly to the axis of the primary rotor (1) through a coupling part.

On activating the propulsion system (4) the primary rotor enters and maintains a rotational motion at a constant speed (1) and, immediately, through the magnetic interaction in its rotors, the set of secondary rotors enters and maintains a rotational motion at a constant speed (2).

Through the magnetic interaction in its rotors, the Power Transmission System generates kinetic energy capable of producing and maintaining its set of secondary rotors in a rotational motion at constant speed (2), which possess a combined mass greater than the mass of the primary rotor (1), at a constant average speed greater than the constant average speed of the primary rotor (1), without there being any connecting physical link between the primary rotor (1) and its set of secondary rotors (2) and without any type of external energy physically connected to its set of secondary rotors (2).

The force which the kinetic energy produces, capable of creating and maintaining the rotational motion of its set of secondary rotors at a constant speed (2), derives from the magnetic energy in the parts of the Power Transmission System.

In the secondary rotors (2), the direction of the magnetic field of the magnets (3) used, is in the axial direction parallel to the height of each magnet.

In the primary rotor (1), the direction of the magnetic field of the magnets (3) used, is parallel to the width of each magnet.

The triangular shaped horizontal base used for positioning the rotors must be made from a non-magnetic material with a low expansion coefficient.

The type of magnet used may be a neodymium-iron-boron (NdFeB) magnet, and may also be coated with an Ni—Cu—Ni alloy. Despite the option of choosing the magnet, the weight of the mass of each secondary rotor (2) must be kept proportional to the intensity of the magnetic field of the magnets (3) present in each secondary rotor (2).

Another very important element for the Power Transmission System's being able to function correctly, is the matter of spacing and height between the primary rotor (1) and the secondary rotors (2). The spacing and height are essential factors to the perfect functioning of the system. The spacing and height between the primary rotor (1) and the secondary rotors (2) must be proportional to the intensity of the magnetic field of the magnets (3) contained in the rotors, so that there is correct magnetic interaction between them.

The spacing and height must always be equal between the axis of the primary rotor (1) and the axis of the secondary rotors (2), and the measurement of this height and the spacing between the rotors must always be proportional to the intensity of the magnetic field of the magnets (3) present in each rotor.

In one form of the realization, the Power Transmission System presents secondary rotors (2) which may comprise eight magnets for each rotor and in the case of the primary rotor may comprise two magnets. However, the number of magnets is related to the intensity and arrangement of the magnetic fields present in each rotor and the energy which can be produced.

The Power Transmission System hereby disclosed may be integrated into a system of a larger size composed of at least two overlapping power transmission systems, one on top of the other, using a single propulsion system dimensioned in accordance with the number of power transmission systems placed in the said system of the largest size. The power transmission systems may be stacked without the occurrence of magnetic interference in the functioning of the different layers of the system.

The primary rotor (1) is set in motion by part of the propulsion system (4), which achieves a rotational speed between 100 and 300 rpm. In one form of more specific realization, the rotational speed achieved is between 180 and 200 rpm.

For an ideal interaction between the magnets of the primary rotor (1) and the magnets of the secondary rotors (2), the centers of the secondary rotors (2) are the same distance from each other, at a distance of between 200 and 300 mm. The centers of the secondary rotors (2) are also equidistance from the center of the primary rotor (1), at a distance of between 100 and 200 mm.

To increase the efficiency of the Power Transmission System, the elements may be introduced in an area sealed in a vacuum.

In any of the forms of possible realizations, one of the ways of capturing the energy produced by the system or by the set of various systems is through a set of bobbins designed and positioned appropriately around each rotor of the system or set of power transmission systems. Another option is the installation of generators in the axis of the secondary rotors (2) which may execute the said capture of energy.

Possible Embodiment

Through the magnetic interaction between its rotors, the Power Transmission System generates kinetic energy capable of producing and keeping in rotational motion its set of secondary rotors, at constant speed, (2).

In one embodiment, secondary rotors were executed (2) which possess a joint mass comprising 1899.80 g (154.48% greater than the mass of the primary rotor (1)), at an average constant speed of 356.93 rpm (77.29% greater than the average constant speed of the primary rotor (1)), without there being any physical connecting link between the primary rotor (1) and its set of secondary rotors (2) and without any kind of external energy physically connected to the set of secondary rotors (2).

One practical study conducted employed as its basis the following technical characteristics of the neodymium magnets used in the Power Transmission System:

| Primary rotor magnets | Quant. | Minimum energy value/$m^3$ | Volume in $m^3$ of the magnet | Energy in Joules | Total energy in Joules |
| --- | --- | --- | --- | --- | --- |
| Rectangular Nd | 2 | 303000 J/$m^3$ | 0.00002700 | 8.181 | 16.362 |

| Secondary rotor magnets | Quant. | Minimum energy value/$m^3$ | Volume in $m^3$ of the magnet | Energy in Joules | Total energy in Joules |
| --- | --- | --- | --- | --- | --- |
| Cylindrical Nd | 24 | 318000 J/$m^3$ | 0.00000314 | 0.998 | 23.952 |

As can be seen, the total energy of the different magnets which comprise the Power Transmission System is 40.314 J. The average speed of the four rotors, one primary rotor and three secondary rotors, is 318.03 rpm, or 5.300 rps. So, we can conclude that the energy of the magnets which comprise the prototype of the Power Transmission System, through their rotational speed, is capable of producing approximately 213.664 J/s of energy which represents power of 213.644 W.

With the current technology, there is no bobbin circuit which allows for the capture of 100% of this energy produced. Nevertheless, if we consider only the harnessing of 10% of the energy produced, the energy used is 21.366 Wh. If we consider that the system consumes approximately 1.273 W/h, then we will have a net energy production of 20.093 Wh, which means utilization of 1578.39%.

The present description is clearly in no way limited to the realizations presented in this document and a person skilled in the art would be able to foresee many possibilities for modifications thereof without moving away from the general idea, as defined in the claims. The preferential realizations described above are clearly combinable with each other. The following claims also define preferential realizations.

The invention claimed is:
1. A power transmission system comprising
    at least one triangular shaped horizontal base comprising
        a primary rotor positioned at a center of the triangular shaped horizontal base, said primary rotor connected to a propulsion system;
    a set of three secondary rotors, fixed to vertical axis bearings mounted on the triangular shaped horizontal base surrounding the primary rotor and whose spacing between the center of the primary rotor and centers of the set of three secondary rotors is the same; and a first set of magnets mounted on the primary rotor and a second set of magnets mounted on each of the set of three secondary rotors, wherein a top surface of each of the second set of magnets is aligned with a bottom surface of the first set of magnets mounted on the primary rotor, wherein a magnetic field of the second set of magnets mounted on each of the secondary rotors is in an axial direction, parallel to a height of each of the second set of magnets, and a magnetic field of the first set of magnets mounted on the primary rotor is parallel to a width of the first set of magnets.

2. The power transmission system of claim 1, wherein the primary rotor is placed in a higher position than the secondary rotors.

3. The power transmission system of claim 1, wherein the propulsion system is a motor reducer.

4. The power transmission system of claim 1, wherein the propulsion system is connected to the primary rotor through a series of pulleys with a toothed belt.

5. The power transmission system of claim 1, comprising at least two overlapping triangular shaped horizontal bases and a single propulsion system installed at the center of the lower triangular base.

6. The power transmission system of claim 5, wherein the propulsion system is directly connected to the axis of the primary rotor through a coupling part.

7. The power transmission system of claim 1, wherein the horizontal base is made of non-magnetic material.

8. The power transmission system of claim 1, wherein the magnets are made of a neodymium-iron-boron alloy.

9. The power transmission system of claim 1, wherein the magnets are coated with a Ni—Cu—Ni alloy.

10. The power transmission system of claim 1, wherein electric energy is captured around the primary rotor and the secondary rotors.

11. The power transmission system of claim 1, wherein electric energy is captured in the vertical axis of the secondary rotors.

12. The power transmission system of claim 1, wherein the system is installed in a vacuum sealed area.

* * * * *